United States Patent
Szarka

(10) Patent No.: US 10,844,831 B2
(45) Date of Patent: Nov. 24, 2020

(54) WAVE ENERGY CAPTURE SYSTEM

(71) Applicant: FORTITUDO MARIS LTD, Newton Abbot Devon (GB)

(72) Inventor: Zsolt Szarka, Newton Abbot Devon (GB)

(73) Assignee: FORTITUDO MARIS LTD, Newton Abbot Devon (GB)

( * ) Notice: Subject to any disclaimer, the term of this patent is extended or adjusted under 35 U.S.C. 154(b) by 0 days.

(21) Appl. No.: 16/333,572

(22) PCT Filed: Sep. 25, 2017

(86) PCT No.: PCT/GB2017/052864
§ 371 (c)(1),
(2) Date: Mar. 14, 2019

(87) PCT Pub. No.: WO2018/055412
PCT Pub. Date: Mar. 29, 2018

(65) Prior Publication Data
US 2019/0234371 A1 Aug. 1, 2019

(30) Foreign Application Priority Data
Sep. 26, 2016 (GB) .................................. 1616289.3

(51) Int. Cl.
*F03B 13/00* (2006.01)
*F03B 13/20* (2006.01)
(Continued)

(52) U.S. Cl.
CPC ............ *F03B 13/20* (2013.01); *F03B 13/148* (2013.01); *F03B 13/188* (2013.01); *Y02E 10/38* (2013.01)

(58) Field of Classification Search
CPC ...... F03B 13/148; F03B 13/188; F03B 13/20; Y02E 10/38
See application file for complete search history.

(56) References Cited

U.S. PATENT DOCUMENTS 3,989,951 A * 11/1976 Lesster ................. F03B 13/148
  290/53
4,782,663 A * 11/1988 Bellamy ............... F03B 13/188
  290/53
(Continued)

FOREIGN PATENT DOCUMENTS

CN     103994018 A    8/2014
GB       2007314 A    5/1979
(Continued)

OTHER PUBLICATIONS

International Search Report and Written Opinion (International Application No. PCT/GB2017/052864); dated Nov. 28, 2017; 14 pages.

*Primary Examiner* — Julio C. Gonzalez
(74) *Attorney, Agent, or Firm* — Howard & Howard Attorneys PLLC

(57) ABSTRACT

Methods, system and devices 10 for capturing wave energy are disclosed. A submersible wave energy capture device 10 comprises a tube 12 and a plurality of one-way valves 21, 31, 41. The tube 12 has a seawater inlet 11 at an upstream end 10*u* of the tube 12. The downstream end 10*d* of the tube 12 is communicable with an energy utilisation means 2 powered by seawater flow from the tube 12. The one-way valves 21, 31, 41 divide the tube 12 into a series of chambers 20, 30, 40. The chambers comprises elastic walls 22, 32, 42. These are deformable so as to alter an effective internal volume of each respective chamber 20, 30, 40. The valves 21, 31, 41, open to permit water flow within the tube 12 in a downstream direction, and close to resist water flow within the tube 12 in an upstream direction.

18 Claims, 3 Drawing Sheets

(51) Int. Cl.
   *F03B 13/14* (2006.01)
   *F03B 13/18* (2006.01)

(56) References Cited

U.S. PATENT DOCUMENTS

| | | | | |
|---|---|---|---|---|
| 5,167,483 | A * | 12/1992 | Gardiner | F03B 1/00 290/43 |
| 6,396,162 | B1 * | 5/2002 | Carrillo | F03B 13/08 290/43 |
| 8,836,153 | B2 * | 9/2014 | Ehrnberg | F03B 13/148 290/42 |
| 2010/0019498 | A1 | 1/2010 | Pollack et al. | |
| 2010/0314871 | A1 * | 12/2010 | Jean | F03B 13/185 290/42 |
| 2011/0116942 | A1 * | 5/2011 | Duffy | F03B 13/188 417/331 |
| 2013/0038063 | A1 * | 2/2013 | Tawil | A01G 15/00 290/53 |
| 2014/0345262 | A1 * | 11/2014 | Ehrnberg | F03B 13/188 60/327 |

FOREIGN PATENT DOCUMENTS

| | | |
|---|---|---|
| GB | 2024957 A | 1/1980 |
| GB | 2384031 A | 7/2003 |
| GB | 2450914 A | 1/2009 |
| WO | 34/00583 A1 | 2/1984 |
| WO | 2009/106836 A2 | 9/2009 |

\* cited by examiner

WAVE ENERGY CAPTURE SYSTEM

FIELD OF THE INVENTION

The present invention relates to methods, devices and systems for capturing wave energy, in particular from sub-surface waves.

BACKGROUND TO THE INVENTION

Wave energy devices come in different forms. One type of wave energy device utilises the rising and falling motion of tides, for example, utilising a buoyant member that acts against a stationary member anchored to the seafloor. The rising and falling motion of tides are relatively predictable and regular in nature and so represent a relatively uncomplicated source from which wave energy can be extracted.

Close to the shoreline where wave energy devices can be more easily installed and maintained, the ebb and flow of sub-surface waves moving reciprocally along the sea floor represent a more powerful source of wave energy to be captured. However, such wave energy is arrhythmic and less predictable in nature. Accordingly, it is difficult to harness a regular and continuous source of energy from it, and also difficult to optimise power generation equipment for efficiency of operation within a particular power band.

Additionally, wave energy devices installed close to the shoreline must be more sensitive to environmental factors including marine life and human activities such as bathing and shipping. Turbines present problems such as blade strike and noise, the latter being particularly injurious to marine life that rely on echo location.

It is against this background that the present invention has been conceived.

SUMMARY OF THE INVENTION

According to a first aspect of the present invention there is provided a wave energy capture device comprising at least one of: a tube and a plurality of one-way valves. Preferably, the wave energy device is fully-submersible. As such, the wave energy device may be arranged to capture energy from sub-surface waves.

Preferably, the device comprises a tube with a seawater inlet at an upstream end of the tube. Ideally, a downstream end of the tube is communicable with an energy utilisation means. The energy utilisation means may be powered by seawater flow from the tube.

The one-way valves may be arranged to divide the tube into a series of chambers. The or each chamber comprises elastic walls. Ideally, these are deformable so as to alter an effective internal volume of the or each respective chamber.

Preferably, each of the valves are arranged to open to permit water flow within the tube in a downstream direction. Preferably, each of the valves being arranged to close to resist water flow within the tube in an upstream direction.

Preferably, at least one of the chambers are arranged to expand in response to water flow within the tube in a downstream direction into the at least one chamber.

Preferably, the valve proximal to the inlet is arranged to open in response to water flow into the inlet. Preferably, the valve proximal to the inlet is arranged to close in response to water flow away from the inlet. The inlet may comprise a funnel.

Preferably, the device further comprises a water-permeable shell enveloping at least one of the chambers. The shell may be arranged to limit the expansion of the elastic walls of the or each chamber. The shell may comprise a mesh.

Advantageously, the use of the shell allows the material from which the elastic walls are constructed to be more responsive to water pressure changes, thereby increasing the energy capture capability of the device. Specifically, the elastic walls can be thinner or more elastic than otherwise practical in a marine environment where tidal forces are highly variable. The use of a shell increases the sensitivity of the device to small forces without overtly increasing the liability of the device to damage from large forces.

Preferably, the internal volume of a region of the shell enveloping a respective chamber substantially defines a maximum volume of said respective enveloped chamber.

Preferably, chambers located closer to the upstream end have a large average outer circumference relative to chambers located closer to the downstream end.

Preferably, the tube tapers inwardly from the upstream end to the downstream end.

Preferably, the one-way valves located closer to the upstream end have a larger fluid flow aperture relative to one-way valves located closer to the downstream end.

Preferably, the or each one-way valve comprises a plurality of flexible valve members, each being connected via a root portion of their periphery to an interior circumferential surface of the tube. Preferably, the or each one-way valve is a bicuspid or tricuspid valve.

The device may comprise an inlet filter. The device many comprise an inlet cover.

According to a second aspect of the present invention there is provided a system for utilising energy from a device according to the first aspect of the present invention. Said system may be an electrical energy generation system. The system may comprise a turbine and an electrical generator. The system may comprise a plurality of devices according to the first aspect of the present invention, ideally having their respective downstream ends connected to a common energy utilisation means. The system may comprise one or more anchors for anchoring the device to a sea floor. The system may comprise one or more tethers for connecting between the device(s) and the anchors. The system may comprise an adjustable tether system for controlling the depth of the or each device.

According to a third aspect of the present invention there is provide a method of capturing wave energy. The method may comprise using the device according to the first aspect of the present invention, and/or the system of utilising energy according to the second aspect of the present invention. The method may comprise at least one of the steps of:

providing a tube having an inlet at an upstream end of the tube, the tube being divided into a series of chambers by a plurality of one-way valves arranged to open to permit water flow within the tube in a downstream direction, and each of the valves being arranged to close to resist water flow within the tube in an upstream direction;

submersing a tube into sea water;

connecting a downstream end of the tube to an energy utilisation means.

It will be understood that features and advantages of different aspects of the present invention may be combined or substituted with one another where context allows.

For example, the features of the device and/or system described in relation to the first and/or second aspects of the present invention may be provided as part of the method described in relation to the third aspect of the present invention. For example, the method may comprise providing the water-permeable shell, and positioning it to envelope at least one of the chambers.

Furthermore, such features may themselves constitute further aspects of the present invention. For example, the features of the adjustable tether system may themselves constitute further aspects of the present invention.

BRIEF DESCRIPTION OF THE DRAWINGS

In order for the invention to be more readily understood, embodiments of the invention will now be described, by way of example only, with reference to the accompanying drawings in which.

SPECIFIC DESCRIPTION OF THE PREFERRED EMBODIMENTS

Figure 1:
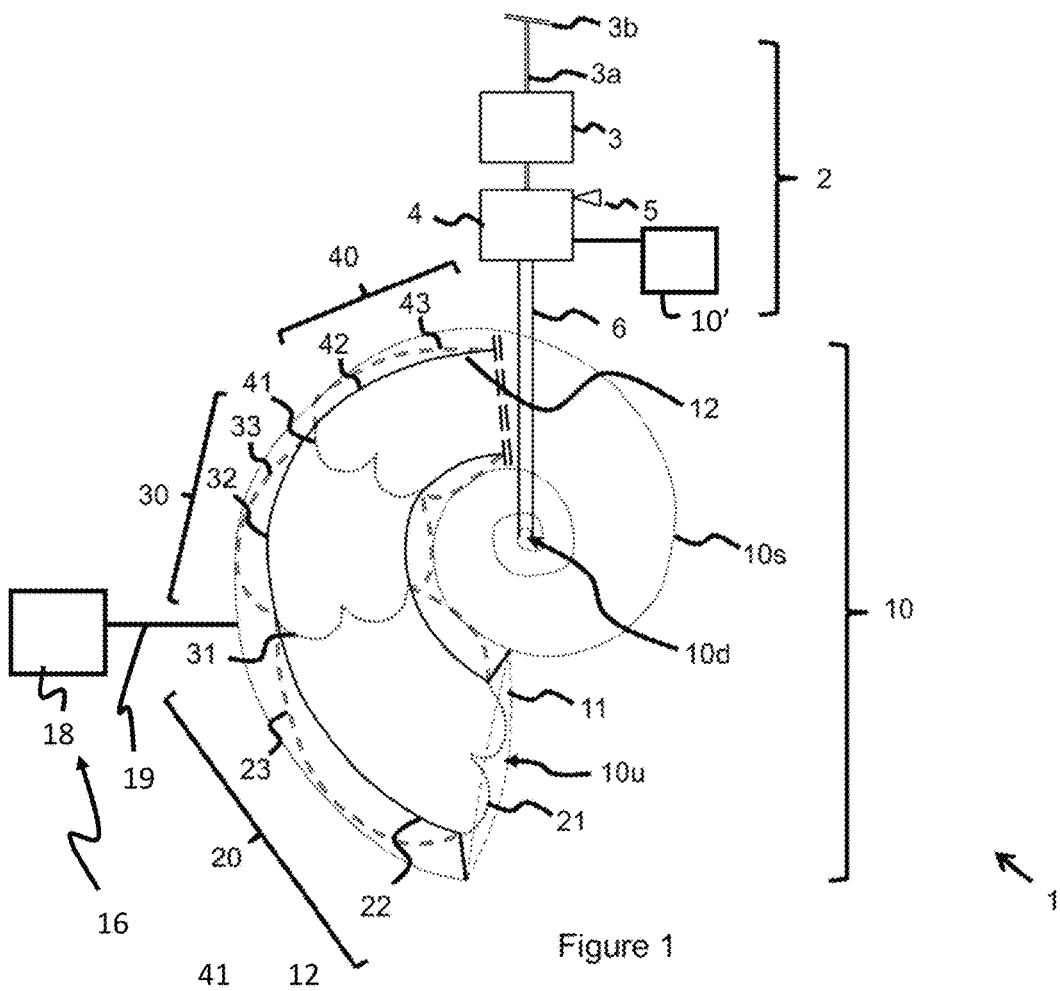
FIG. 1 is a sectional schematic view of a sub-surface wave-powered electrical energy generation system incorporating a wave energy capture device according to a first embodiment of the present invention.

FIG. 1 is a sectional schematic view of the energy generation system 1 that is powered by a sub-surface sea waves. The system 1 comprises an energy utilisation system 2 and a wave energy capture device 10 according to a first embodiment of the present invention.

The energy utilisation system 2 comprises an electrical generator 3, an electrical cable 3a, a load 3b, a turbine 4 and a pipe 6. The electrical generator 3 is electrically coupled via the electrical cable 3a to the load 3b. The electrical generator is mechanically powered by the turbine 4 which is, in turn, mechanically powered by water flow input to the turbine 4 from the pipe 6. The turbine 4 comprises an exhaust 5 as a water outlet. The pipe 6 channels water to the turbine 4 from a downstream end 10d of the wave energy capture device 10.

The wave energy capture device 10 comprises an elongate, tapered water tube 12 of a generally annular cross-section extending between the downstream end 10d and an upstream end 10u of the device 10. Accordingly, the tube 12 shares the same downstream and upstream ends 10d, 10u as the device 10 in general. A funnel-like inlet 11 is provided at the upstream end 10u.

Additionally, the tube 12, and so the wave energy capture device 10 in general, follows a coiled shape similar to a nautilus shell. This is indicated in FIG. 1 by dotted line 10s although it should be noted that dotted line 10s does not necessarily form part of the physical structure of the wave energy capture device 10, but rather is indicative of its general overall shape. The tube 12 tapers inwardly towards the downstream end 10d, and comprises elastic walls that are substantially impermeable to water and are capable of deformation to alter the effective volume of the tube 12.

The wave energy capture device 10 further comprises a series of one-way valves that divide the tube 12 into a series of chambers. Only a first, second and third chamber 20, 30, 40 are shown representatively in FIG. 1, and these are those closest to the upstream end 10u in sequence. However, additional chambers between the upstream end 10u and downstream end 10d of the tube 12 exist. Each of the shown chambers 20, 30, 40 are headed by a corresponding first, second and third valve 21, 31, 41, which are also representative of other valves present in the device 10, but omitted from FIG. 1 for clarity.

In general, two sequential valves and a portion of the wall of the elastic tube 12 between them define a respective chamber. Accordingly each chamber has elastic walls deformable so as to alter an effective internal volume of that chamber. However, it should be noted that a circumferential region of the tube 12 adjacent to each valve may be reinforced to prevent deformation or flex so as to maintain the reliability of operation of each respective valve.

Due to the taper of the tube, valves located closer to the upstream end 10u have a larger fluid flow aperture relative to valves located closer to the downstream end 10d. Additionally, chambers located closer to the upstream end 10u have a larger average outer circumference relative to chambers located closer to the downstream end 10d. As shown in FIG. 1, the largest chamber 20 is that which is closest sequentially to the upstream end 10u, with the chamber 20 notionally capable of accommodating a larger volume of sea water per unit length than the subsequent chambers 30, 40, in the sequence. This is on the basis that the chambers 20, 30, 40 are subject to the same internal and external pressure. It should also be noted that in the case that the internal pressure of the chambers 20, 30, 40 are the same as one another, and also the pressure external to the device 10, the corresponding elastic walls portions 22, 32, 42 of each chamber are not deformed from their original unstressed position—as shown in FIG. 1.

Figure 2:
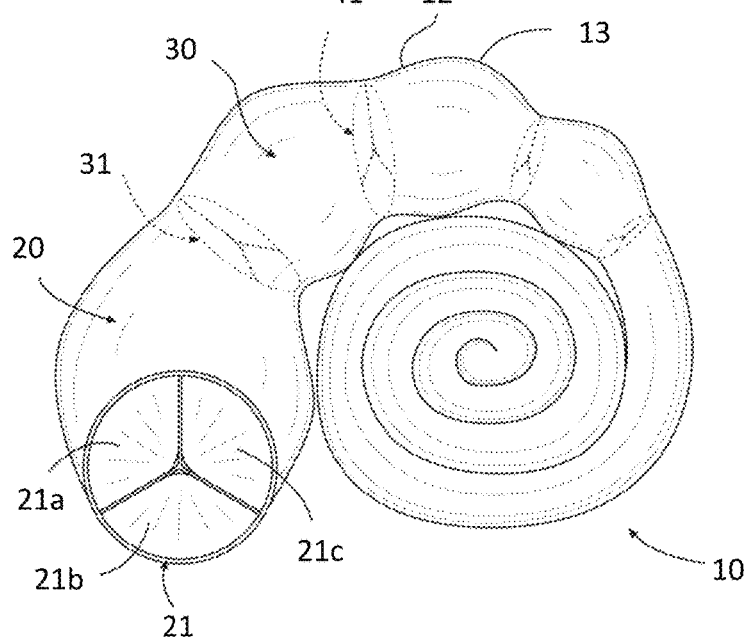
FIG. 2 is a schematic view of the wave energy capture device of FIG. 1 in isolation.

Referring briefly to FIG. 2 in which a schematic view of the wave energy capture device of FIG. 1 is shown in isolation, the device 10, also comprises a water-permeable shell 13 which is of a meshed construction, and positioned outside the tube 12. This also broadly follows the same shell-like contour, but with sinuous bulges that are periodic in coincidence with a respective chamber 20, 30, 40 of the device. Moreover, the maximum circumference of each bulge approximately axially coincides with a middle of each chamber. A local minimum circumference of the shell 13, between each bulge, approximately axially coincides with the boundary between two adjacent chambers, and so is also coincident with the position of a valve. The shell 13 therefore has a series of regions, with each region of the shell enveloping a respective chamber.

Specifically, and referring back to FIG. 1, the first chamber 20, as defined by the first and second valves 21, 31, and the first elastic wall portion 22, is enveloped by a first shell region 23. The second chamber 30, as defined by the second and third valves 31, 41, and the second elastic wall portion 32, is enveloped by a second shell region 33. The third chamber 40, as defined by the third valve 41, a fourth valve (not shown), and the third elastic wall portion 42, is enveloped by a third shell region 43.

Each one-way valve in the present embodiments is in the form of a tricuspid valve, which are well-known in the art of prosthetic heart valves. An example of such a tricuspid valve is disclosed in publication U.S. Pat. No. 4,222,126, the contents of which is hereby incorporated by reference to the extent permissible by applicable law.

Each valve has three flexible valve members, each being connected via a root portion of their periphery to an interior circumferential surface of the tube 12. The valves are only schematically represented in FIG. 1, and so only two of the three valve members are shown in FIG. 1. However, referring to FIG. 2, all three valve members 21a, 21b, 21c of the first valve 21 are represented. Subsequent valves in the sequence are also represented as having three valve members. Nonetheless, both FIG. 1 and FIG. 2 show isobaric conditions in which the elastic wall portion of each chamber is unstressed, and the valves are in a closed position, with the valve members biased towards one another and abutting to seal each chamber.

Moreover, each valve is arranged to close in response to attempted water flow in the tube in an upstream direction towards the upstream end 10u. Thus each valve resists water flow in this upstream direction. Conversely, each valve is arranged to open in response to water flow within the tube in a downstream direction towards the downstream end 10d. Put another way, a pressure differential across each valve will only substantially open the valve if the water pressure upstream is greater than the water pressure downstream of that valve.

Figure 3:
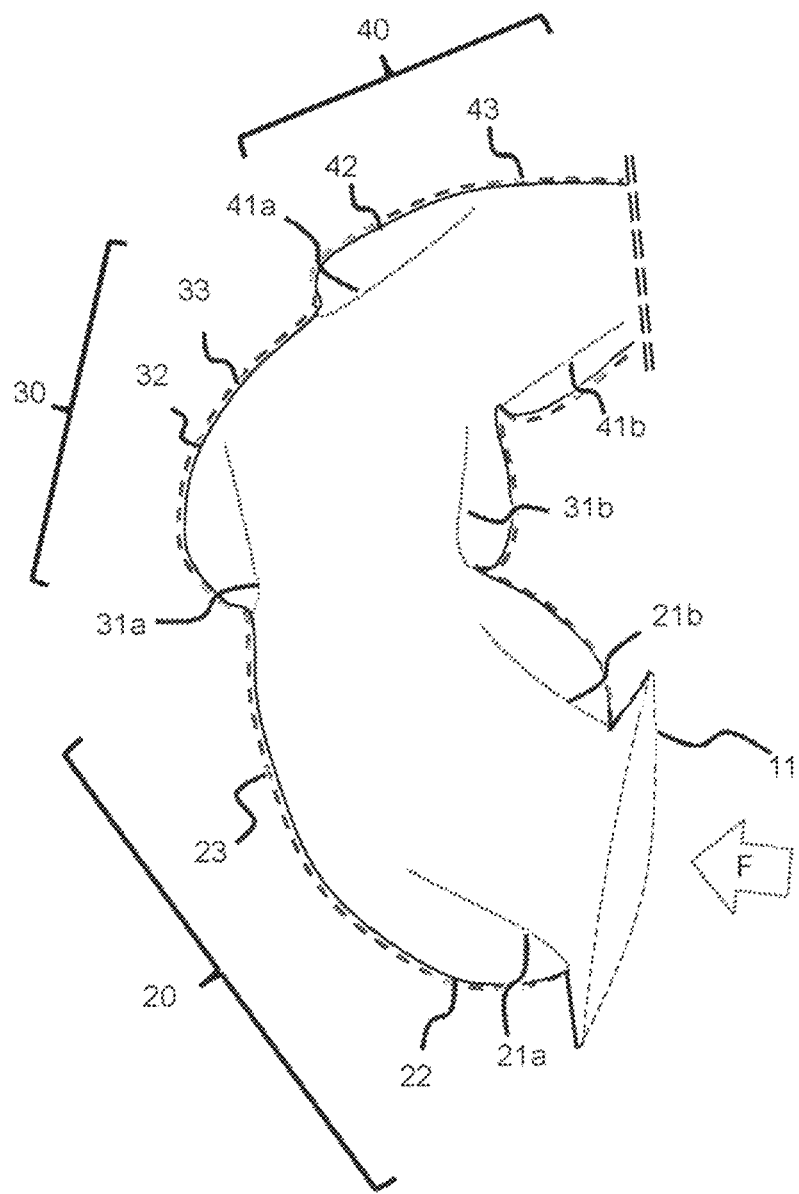
FIG. 3 is an enlarged partial sectional schematic view of a representative series of chambers of the wave energy capture device of FIG. 1.

Accordingly, a flow of water toward the funnel-like inlet 11 caused by a sub-surface wave causes the valves 21, 31, 41 to progressively open. This is depicted in FIG. 3 in which is shown in isolation an enlarged sectional schematic view of a part of the device 10 having the first, second and third chambers 20, 30, 40. Again, only two of three valve members of each of the first, second and third valves 20, 30, 40 are shown.

The flow of water, as indicated by arrow F, is concentrated by the funnel-like inlet 11 such that the water pressure upstream of the first valve 21 is greater than the water pressure downstream of that valve 21 inside the chamber 20. This causes the valve members 21a, 21b to part to allow the water to flow into the first chamber 20. At the same time, the increase in pressure internal to the chamber 20 relative to water pressure external to the chamber 20 causes the elastic wall portion 22 of the first chamber 20 to expand. Water flow continues in a similar manner to the second chamber 30, and the third chamber 40 and so on, with the valve members 31a, 31b, 41a, 41b parting to let water flow into the chambers 30, 40, and the respective elastic wall portions 32, 42 expanding in response to the increase in pressure within each chamber 30, 40.

The expansion of each wall portion of the tube 12 is limited by a respective region of the shell 13. Specifically, the first wall portion 22 has its expansion limited by the first shell region 23, the second wall portion 32 has its expansion limited by the second shell region 33, and the third wall portion 42 has its expansion limited by the first shell region 43. Thus, the internal volume of a shell region enveloping a respective chamber substantially defines a maximum volume of said respective enveloped chamber.

Hence, water is driven under action of the sub-surface wave along sequential chambers of the tube 12, and so to the energy utilisation mean 2.

Under a condition where a sub-surface wave is travelling in the opposite direction away from the inlet 11, and there is a greater pressure inside the first chamber 20 relative to the pressure directly external to the inlet 11, the valve members 21a, 21b will close against one another, preventing external outflow from the first chamber 20. Similarly, if the pressure within any upstream chamber is less than the pressure within an adjacent downstream chamber, the valve between those adjacent chambers will close to prevent water flow in an upstream direction toward the upstream end 10u.

Additionally, due to the arrhythmic and localised nature of sea waves, there will be many pressure variations at different locations external to the device 10. This works in conjunction with the deformable elastic wall portions of the tube 12 to invoke pressure differentials across chambers. When there is a greater pressure in an upstream chamber compared to an adjacent downstream chamber, the valve between them opens. When there is a greater pressure in a downstream chamber compared to an adjacent upstream chamber, the valve between them closes. Furthermore, where there is a greater pressure external to the device 10 than inside it, the deformable wall portions of the tube 12 are squeezed to drive water out from the downstream end 10d of the device 10. Additionally, the tapered construction of the tube 12, with the upstream end 10u being wider than the downstream end 10d facilitates water flow in a downstream direction.

As mentioned, the first embodiment described with reference to FIGS. 1 to 3 is coiled in such a manner that does not overly interfere with water flow through the tube 12 of the device 10, but greatly facilitates transport and installation of the device 10, which involves anchoring the device 10 to the sea floor. However, the device 10 does not necessarily need to be coiled.

Figure 4:
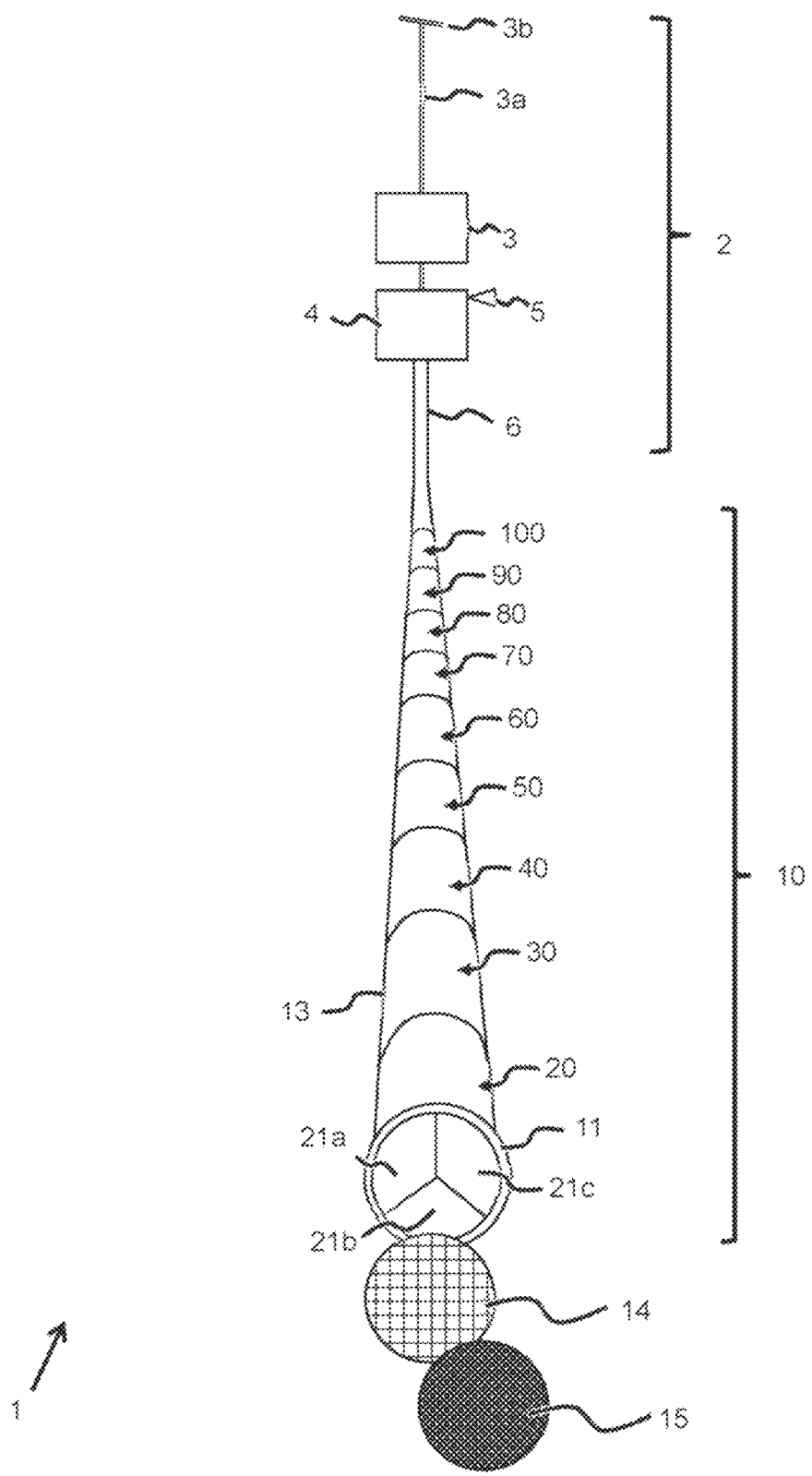
FIG. 4 is a schematic view of a sub-surface wave-powered electrical energy generation system incorporating a wave energy capture device according to a second embodiment of the present invention.

FIG. 4 shows an alternative second embodiment of the present invention in which the device 10 is extended linearly. The second embodiment has the same principle features and characteristics as the first, with the same reference numerals being used to denote like features. The device 10 of this second embodiment is schematically shown in FIG. 4 as having ten chambers 20, 30, 40, 50, 60, 70, 80, 90, 100.

Specifically, FIG. 4 is a schematic view of a sub-surface wave-powered electrical energy generation system 1 of which the linear wave energy capture device 10 according to a second embodiment is part. The system 1 comprises the energy utilisation means 2 as already described in relation to the first embodiment.

The system 1 is additionally shown in FIG. 4 to comprises an inlet filter 14, and an inlet cover 15. The inlet filter 14 is shown separate to the inlet 11, however in practice is position over the inlet 11 to prevent ingress into the tube 12 of objects such as sea debris and marine life. The inlet cover 15 is also positionable over the inlet 11 to control the wave power received by the device, a partial covering letting in a part of the total wave power otherwise channeled into the device 10. The inlet filter 14 and the inlet cover are also provided as part of the first embodiment of the present invention, even if they are not explicitly shown in FIGS. 1 to 3.

During the practical use of the device according to any embodiment of the present invention, it can become necessary to control the depth of the device 10. During periods of high tidal activity, it can be desirable to position the device closer to the sea floor, at a greater depth so as to prevent damage whilst maintaining operation of the device. Conversely, during periods of low tidal activity the device may be moved closer to the surface so that the more pronounced ebb-and-flow power of the sub-surface waves closer to the surface are sufficient to enable the device 10 to operate efficiently.

To this end, the device 10 may be connected to one or more anchor points on the sea floor via an adjustable tether system 16 for controlling the depth of one or more of the device(s) 10, 10'. As shown in FIG. 1, the adjustable tether system 16 may include one or more anchors 18 for anchoring the device(s) 10, 10' to a sea floor. The adjustable tether system 16 may comprise one or more tethers 19 for connecting between the device(s) 10, 10' and the anchors 18. As wave energy increases beyond a predetermined amount the adjustable tether system can be configured to automatically draw the device towards the sea floor to prevent damage. Conversely as wave energy reduces, the adjustable tether system can be configured to automatically release the device so that it can rise towards the surface. Such an adjustable tether system may be powered mechanically by the wave energy and so the depth of the device according to the present embodiment may be proportional to the wave power. Alternatively, the adjustable tether system may be electrically powered, at least in part.

Additionally, the wave energy device 10 according to embodiments of the present invention may have a predetermined buoyancy that optimises the forces required to control its depth and the rate of change of depth responsive to sudden changes in wave energy. This can be achieved, at least in part, via provision of buoyancy devices acting upon the wave energy device. These may be in the form of surface and/or sub-surface buoys that attached to the wave energy device 10, for example, via buoy lines. Advantageously, the provision of surface buoys can serve to both control the depth of the wave energy device, and also provide a way of easily indicating the location of the wave energy device. Thus, the wave energy device is less likely to be damaged unintentionally by shipping traffic, and can be more easily located for servicing.

Alternatively, different sets of devices 10 according to embodiments of the present invention may be positioned at predetermined and fixed depths. In such a case, one or more of the covers 15 may be provided. During periods of high tidal activity, it is envisaged that the cover 15 would protect devices positioned at a shallower depth.

Conversely during periods of low tidal activity the covering may be diverted to devices at a deeper location. This would be to prevent the operation of such deeper located devices at sub-optimal efficiencies rather than to protect them.

Such a cover may be driven by an adjustment system similar to that described above relating to the adjustable tether system; either mechanically-powered solely from wave energy or incorporating an electrically-powered aspect.

Where a device 10 according to an embodiment of the present invention is to be located at a fixed depth, this may achieved by attaching it to a platform hugging the sea floor. Such a platform may have embedded within it, or be arranged to otherwise protect, the energy utilisation means 2 powered by the device according to various embodiments of the present invention. In such "fixed-depth" embodiments, buoys may nonetheless be provided as a means to indicate the location of the wave energy device.

The inventor of the present invention has derived inspiration from the human cardiovascular system, and in particular from its ability to maintain relatively consistent blood flow, even during arrhythmia. The device 10, with its elastic wall 12 and tricuspid valves, mimics aspects and advantages of the cardiovascular system. As such embodiments of the present invention provide a wave energy capture device 10 able to convert arrhythmic and unpredictable ebb-and-flow sub-surface wave power, prevalent near a shoreline, into a more predictable and regular flow of water. This can be channeled to power a turbine 4 optimised to efficiently convert such a regular flow of water into electricity.

Whilst the present invention has been conceived to be particularly useful in conjunction with turbines other energy utilisation means 2 are possible. For example, water may be pumped by embodiments up to an inland reservoir used in conjunction with traditional hydroelectric systems.

Furthermore, a plurality of wave energy devices 10, 10' according embodiments of the present invention may be provided as part of a system for electrical energy generation.

The output stream of water from the downstream end 10d of multiple devices 10, 10' can be combined into a single pipe 6 to feed the turbine 4 with an even more regular flow of water power than possible from a single device 10 according to the present invention. The increase in regularity is due to an averaging effect of the combination of individual streams.

In alternative embodiments to the present invention, other features may be provided in addition to or substituted in place of the features described herein.

For example, whilst multi-cuspid valves are used in the described embodiments, and are generally preferred due to the similarities and advantages associated with a cardiovascular system, alternative one-way valves are possible substitutions. These may have flexible valve members. Alternatively, they may have guided rigid valve members, for example shaped as balls, rings, or hinged, optionally being spring-loaded towards a closed state.

Many different types of energy utilisation means are also possible. The present embodiments are directed towards utilising the energy from the water flow output from the device to generate electricity. However, this kinetic power may be used in other ways, for example directly driving machinery, or other ways known in the art.

Although the invention has been described in conjunction with specific embodiments thereof, it is evident that many alternatives, modifications and variations will be apparent to those skilled in the art. Accordingly, it is intended to embrace all such alternatives, modifications and variations that fall within the scope of the appended claims.

The invention claimed is:

1. A submersible wave energy capture device comprising:
a tube;
a seawater inlet at an upstream end of the tube, and a downstream end of the tube communicable with an energy utilisation means powered by seawater flow from the tube; and
a plurality of one-way valves dividing the tube into a series of chambers, each chamber having elastic walls deformable so as to alter an effective internal volume of each respective chamber, wherein the one-way valves located closer to the upstream end have a larger fluid flow aperture relative to one-way valves located closer to the downstream end;
wherein each of the valves are arranged to open to permit water flow within the tube in a downstream direction, and each of the valves being arranged to close to resist water flow within the tube in an upstream direction; and
wherein the device further comprises a water-permeable shell enveloping at least one of the chambers and arranged to limit the expansion of the elastic walls of at least one of the chambers.

2. The device of claim 1, wherein at least one of the chambers are arranged to expand in response to water flow within the tube in a downstream direction into the at least one chamber.

3. The device of claim 1, wherein the valve proximal to the inlet is arranged to open in response to water flow into the inlet; and said valve being arranged to close in response to water flow away from the inlet.

4. The device of claim 1, wherein the internal volume of a region of the shell enveloping a respective chamber substantially defines a maximum volume of said respective enveloped chamber.

5. The device of claim 1, wherein the inlet comprises a funnel.

6. The device of claim 1, wherein chambers located closer to the upstream end have a larger average outer circumference to than chambers located closer to the downstream end.

7. The device of claim 1, wherein the tube tapers inwardly from the upstream end to the downstream end.

8. The device of claim 1, wherein at least one one-way valve comprises a plurality of flexible valve members, each being connected via a root portion of their periphery to an interior circumferential surface of the tube.

9. The device of claim 1, wherein the or each one-way valve comprises a multi-cuspid valve.

10. The device of claim 1, further comprising an inlet filter.

11. The system of claim 10, further comprising one or more anchors for anchoring the device to a sea floor.

12. The system of claim 10, comprising a plurality of wave energy capture devices.

13. The device of claim 1, further comprising an inlet cover.

14. The system of claim 13, further comprising one or more tethers for connecting between the device and the one or more anchors.

15. An electrical energy generation system for utilising energy from a submersible wave energy capture device, the system comprising a turbine powered by water flow from the device and an electrical generator; wherein the wave energy capture device comprises:
    a tube;
    a seawater inlet at an upstream end of the tube, and a downstream end of the tube communicable with the turbine; and
    a plurality of one-way valves dividing the tube into a series of chambers, each chamber having elastic walls deformable so as to alter an effective internal volume of each respective chamber, wherein the one-way valves located closer to the upstream end have a larger fluid flow aperture relative to one-way valves located closer to the downstream end;
    wherein each of the valves are arranged to open to permit water flow within the tube in a downstream direction, and each of the valves being arranged to close to resist water flow within the tube in an upstream direction; and
    wherein the device further comprises a water-permeable shell enveloping at least one of the chambers and arranged to limit the expansion of the elastic walls of the or each chamber.

16. The system of claim 15 further comprising an adjustable tether system for controlling the depth of the device relative to the sea floor.

17. The method of claim 16 wherein the energy utilization means comprises at least one of: a turbine powered by water flow from the device and an electrical generator.

18. A method of capturing wave energy using a wave energy capture device that comprises:
    a tube;
    a seawater inlet at an upstream end of the tube, and a downstream end of the tube communicable with an energy utilisation means powered by seawater flow from the tube; and;
    a plurality of one-way valves dividing the tube into a series of chambers, each chamber having elastic walls deformable so as to alter an effective internal volume of each respective chamber, wherein the one-way valves located closer to the upstream end have a larger fluid flow aperture relative to one-way valves located closer to the downstream end;
    wherein each of the valves are arranged to open to permit water flow within the tube in a downstream direction, and each of the valves being arranged to close to resist water flow within the tube in an upstream direction; and
    wherein the device further comprises a water-permeable shell enveloping at least one of the chambers and arranged to limit the expansion of the elastic walls of at least one chamber;
    wherein the method comprises:
    submersing the tube of the device into sea water; and
    connecting the downstream end of the tube to an energy utilisation means.

* * * * *